United States Patent
Baviskar et al.

(10) Patent No.: US 8,276,110 B2
(45) Date of Patent: Sep. 25, 2012

(54) REDUCING VOLTAGE DROPS IN POWER NETWORKS USING UNUSED SPACES IN INTEGRATED CIRCUITS

(75) Inventors: Dinesh Baviskar, Hsin-Chu (TW);
Wen-Hao Chen, Hsin-Chu (TW);
Chung-Sheng Yuan, Hsin-Chu (TW);
Mark Shane Peng, Hsin-Chu (TW);
Yun-Han Lee, Baoshan Township (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 265 days.

(21) Appl. No.: 12/692,184

(22) Filed: Jan. 22, 2010

(65) Prior Publication Data

US 2011/0185331 A1 Jul. 28, 2011

(51) Int. Cl.
*G06F 17/50* (2006.01)
(52) U.S. Cl. ......... 716/133; 716/115; 716/125; 716/126
(58) Field of Classification Search .................. 716/115, 716/125, 126, 133
See application file for complete search history.

(56) References Cited

U.S. PATENT DOCUMENTS

| | | | |
|---|---|---|---|
| 6,305,000 B1 | 10/2001 | Phan et al. | |
| 6,405,346 B1 * | 6/2002 | Nawa | 716/115 |
| 6,877,144 B1 * | 4/2005 | Rittman et al. | 716/52 |
| 6,904,582 B1 * | 6/2005 | Rittman et al. | 257/734 |
| 7,161,792 B2 * | 1/2007 | Sakurabayashi et al. | 361/303 |
| 7,240,314 B1 | 7/2007 | Leung | |
| 7,272,810 B2 * | 9/2007 | Orita | 326/80 |
| 7,574,344 B2 * | 8/2009 | Shrivastav et al. | 703/14 |
| 7,600,208 B1 * | 10/2009 | Sharma et al. | 716/120 |
| 7,752,578 B2 * | 7/2010 | Allen et al. | 716/123 |
| 7,844,438 B1 * | 11/2010 | Verghese et al. | 703/14 |
| 2004/0049754 A1 * | 3/2004 | Liao et al. | 716/8 |
| 2005/0127972 A1 * | 6/2005 | Chen et al. | 327/218 |
| 2008/0141202 A1 * | 6/2008 | Matsumura et al. | 716/8 |

OTHER PUBLICATIONS

Leung, K-S., "SPIDER: Simultaneous Post-Layout IR-Drop and Metal Density Enchancement with Redundant Fill," IEEE, downloaded Dec. 8, 2008, pp. 33-38.
Leung, K-S., "SPIDER: Simultaneous Post-Layout IR-Drop and Metal Density Enchancement with Redundant Fill," MAGMA, power point, 46 pgs., Year 2005.

* cited by examiner

*Primary Examiner* — Naum Levin
(74) *Attorney, Agent, or Firm* — Slater & Matsil, L.L.P.

(57) ABSTRACT

A method of designing an integrated circuit includes providing an integrated circuit design including a power network. A voltage drop mitigation system is provided, which includes a power strap enhancer configured to automatically find a source node and a terminal node in the power network. A redundant strap for the power network using the voltage drop mitigation system is added, wherein the redundant strap interconnects the source node and the terminal node. After the step of adding the redundant strap, dummy patterns may be added.

21 Claims, 5 Drawing Sheets

REDUCING VOLTAGE DROPS IN POWER NETWORKS USING UNUSED SPACES IN INTEGRATED CIRCUITS

TECHNICAL FIELD

This disclosure relates generally to integrated circuit manufacturing processes and more particularly to reducing IR dropping of power networks.

BACKGROUND

With the advancement of integrated circuit formation technology, the device sizes are scaled down. The device operating voltages (power supply voltages) are also lowered, and applications utilizing increasingly higher frequencies are demanded. As such, the circuit dynamics have started posing issues during operations of integrated circuits formed using recent generations of technologies.

Since the device operating voltages kept declining over years, the device operating voltages, being a potential contributor to the devices' operation, became increasingly important due to their impact on performance and reliability. For example, the device operating voltages have been reduced to about 0.9 volts, or even lower. As a result of such a low voltage, even a few tens of milli-volts in the reduction in the device operating voltages may cause a noticeable impact to the device performance and operation, and chips may fail to meet the target speeds. Also, the reliability of the integrated circuits is adversely impacted since devices may fail to operate if the device operating voltages are lower than certain threshold values.

In an integrated circuit, several factors contribute to the voltage fluctuation, including the power network parasitic and ground network parasitic; the operational speed of the integrated circuit; the intrinsic decoupling capacitances offered by non-switching logic; decoupling capacitors intentionally placed to supply the peak requirement during switching; and the package parasitic. There are two types of voltage drops, namely static voltage drops and dynamic voltage drops. The static voltage drops occur when circuits are at a steady state, while the dynamic voltage drops occur during the switching of signals. From the circuit point of view, the static voltage drops are caused by the resistances in supply and return current paths, and are easy to control through carefully planning the power delivery network. For example, by using upper metal layers (which are thicker than lower metal layers) to deliver the power to circuits, the resistances in power networks and ground networks may be reduced. Also, by placing the blocks/macros according to the current demand, lower static voltage drops may be achieved.

The dynamic voltage drops, on the other hand, are caused by transient currents. Accordingly, controlling dynamic voltage drops is relatively difficult due to their unpredictable nature. In a known approach, designers computed the peak currents for given areas/blocks and the intrinsic capacitance provided by the circuits residing nearby, and then determined the amount of charge that is to be compensated for by using on-chip decoupling capacitors. The additional approaches for solving the dynamic voltage drop problem include placing decoupling capacitors according to the peak-current demands of the integrated circuits.

The conventional approaches for solving the dynamic voltage drop problem, however, suffer from drawbacks. For example, the decoupling capacitors leak when they are idle, and decoupling capacitors consume additional chip areas. Also, modifying the power distribution network is tedious and time consuming as routing has been already done.

On the other hand, although redundant connections may be manually added between power straps to reduce both static and dynamic voltage drops, the method is tedious and error-prone. U.S. Pat. No. 7,240,314 discloses such a method of adding redundant connections by utilizing dummy metals to form redundant straps. However, in this approach, since the dummy metals are not checked by optical proximity correction (OPC), it is not guaranteed that a connection may be made correctly in real silicon chips.

SUMMARY

In accordance with one aspect, a method of designing an integrated circuit includes providing an integrated circuit design including a power network. A voltage drop mitigation system is provided, which includes a power strap enhancer configured to automatically find a source node and a terminal node in the power network. A redundant strap for the power network using the voltage drop mitigation system is added, wherein the redundant strap interconnects the source node and the terminal node. After the step of adding the redundant strap, dummy patterns may be added to further fill up white spaces to meet the metal density requirement.

Other embodiments are also disclosed.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments of the disclosure are discussed in detail below. It should be appreciated, however, that the embodiments provide many applicable inventive concepts that can be embodied in a wide variety of specific contexts. The specific embodiments discussed are merely illustrative and do not limit the scope of the disclosure.

A novel method for reducing voltage drops in power networks and a voltage drop mitigation system for performing the same are provided. The operation of embodiments is discussed. Throughout the various views and illustrative embodiments, like reference numbers are used to designate like elements.

Figure 1:
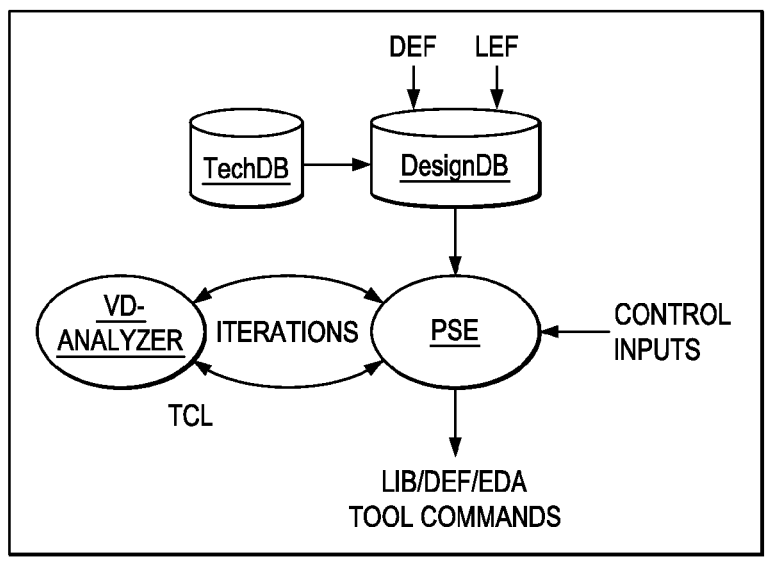
FIG. 1 illustrates an architecture of a voltage drop mitigation system.

Referring to FIG. 1, the architecture of the voltage drop mitigation system in accordance with an embodiment is illustrated. An integrated circuit design, in which power networks, including the power straps that are to be enhanced, are provided, and may be stored in design database DesignDB, which may further be located in a hard drive. The integrated circuit design may be in the form of layouts, which include the routing information of the power networks. In an exemplary embodiment, the integrated circuit design may be translated from design exchange format (DEF) or library exchange format (LEF) to a design database. Technology database TechDB, which can be generated by importing appropriate technology LEF, is linked to design database DesignDB. Technology database TechDB may be used to store information, such as layers of the integrated circuit design, design rules, and/or the like. Thus, whenever design rule checks are performed, the design rules may be read from technology database TechDB. The routing and placement blockages (which specify which parts of the chip area or metallization layers cannot be used for routing and placement) that are specified in the LEF files, however, are not recognized. Such blockages, however, may be specified using the user interface as part of the user-specified parameters. If there are multiple DEFs for a physical representation of the design, then each of them may be imported to design database DesignDB.

Figure 12:
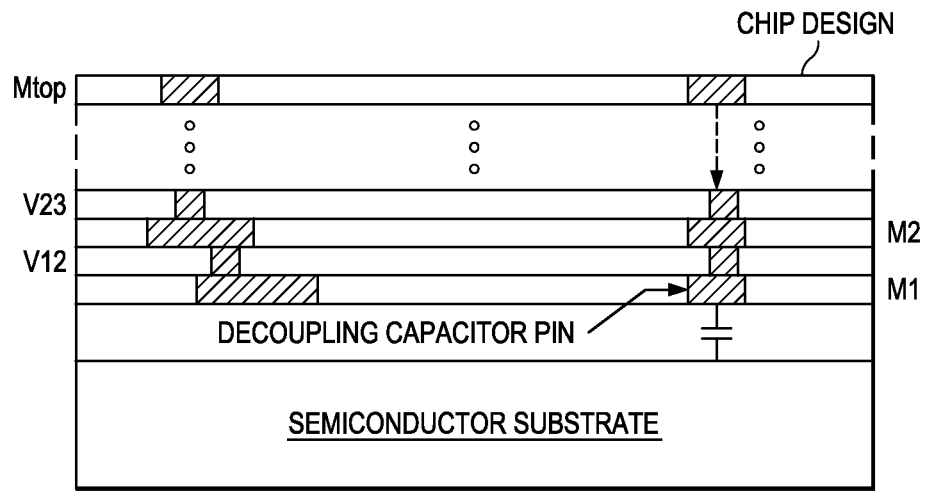
FIG. 12 illustrates a cross-sectional view of a chip representation with a plurality of metallization layers, in which power networks are routed.

The integrated circuit design may include the chip representation, which represents the design of a chip and includes layouts and/or other design information. The chip representation, although not being a physical chip, is actually stored in design database DesignDB, and will be implemented after the chip design is finished. Accordingly, the chip representation will alternatively be referred to as a chip although it may not be a physical chip. The chip includes the design/layout of integrated circuit devices, such as transistors, capacitors, resistors, and/or the like. The integrated circuit devices are interconnected with each other using metallization layers in horizontal planes above the integrated circuit devices. These metallization layers (or levels), up to twelve or more, are commonly referred to M1, M2 .... Mtop, and facilitate signal routing and power distribution (refer to FIG. 13). The intermediate layers between the metal layers are called via layers, and are referred to as V12, V23, etc. For example, layer V12 is between metallization layers M1 and M2. A cross-sectional view of a chip or chip representation is illustrated in FIG. 12, which illustrates a plurality of metallization layers (M1, M2, and the like) over a semiconductor substrate. Power networks are routed in the plurality of metallization layer through metal lines and vias. Those skilled in the art will recognize that power straps, signal conductors, and dummy metals described herein can be made of conductive material, for example, copper, titanium, aluminum, gold, tungsten, or alloys thereof.

Figure 13:
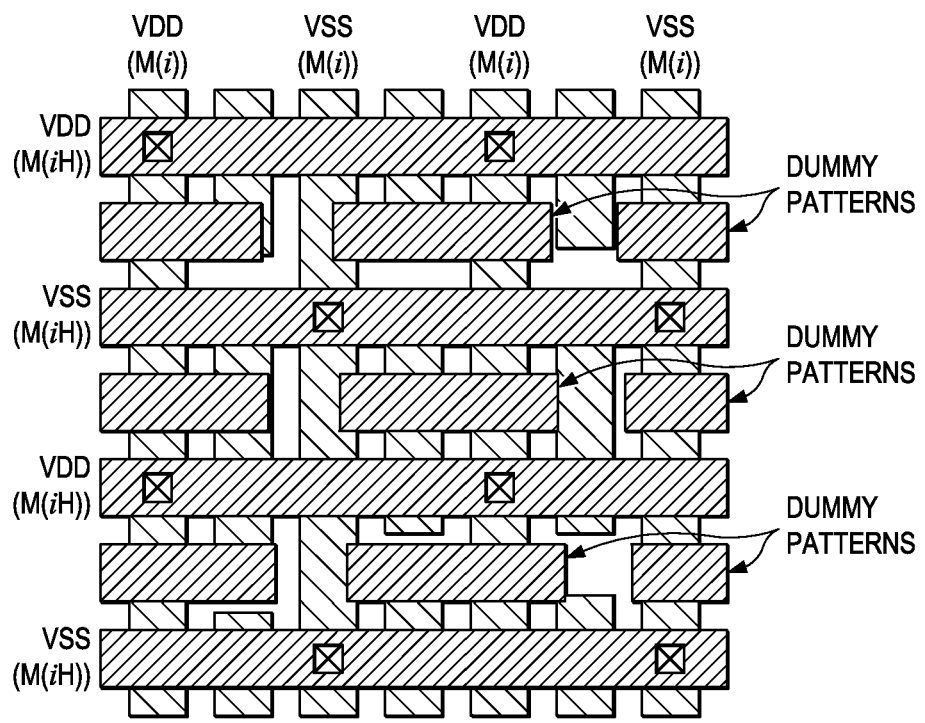
FIG. 13 illustrates a top view of a portion of power networks in two metallization layers.

Referring back to FIG. 1, power strap enhancer PSE sits at the core of a voltage drop mitigation system, and is used to enhance the straps (metal lines) of the power networks in the metallization layers. Power strap enhancer PSE may be an automation tool (for example, a software) running in a computer. The software may include program codes stored in a storage media, such as a hard drive. In an embodiment, power strap enhancer PSE receives the integrated circuit design from design database DesignDB, and performs enhancements on the straps in the power networks, such as VDD network, VSS network, VDDH network, VDDL network, and the like. FIG. 13 illustrates a top view of a portion of the power networks VDD and VSS in two of the metallization layers (referred to as M(i) and M(i+1), with integer i being greater than zero), with vias (checked squares) interconnecting the same power network in different layers. Throughout the description, the term "enhancement" refers to adding a redundant connection(s) to interconnect any two nodes (a source node and a terminal node) in a power network, wherein the two nodes were already electrically connected before the redundant connection(s) is added. Alternatively, the term "enhancement" refers to widening an existing strap (metal line and/or via) in a power network. Adding a redundant connection(s) or widening straps results in the reduction in resistance between the source node and the terminal node.

Figure 2:
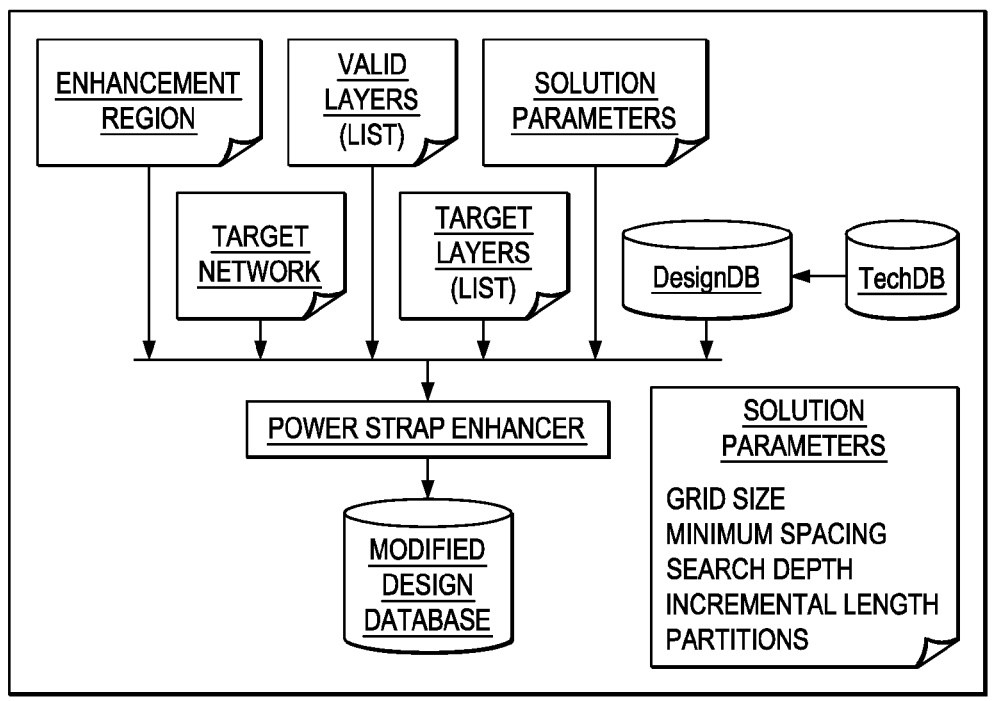
FIG. 2 illustrates the architecture interface and user-interface of the voltage drop mitigation system.

Control inputs may be provided to power strap enhancer PSE to control how the enhancement is performed (refer to FIG. 1). Exemplary control inputs include parameters that are shown in FIG. 2. The output of power strap enhancer PSE may adopt the EDA tool specific command files or any other applicable formats, such as an incremental DEF that can be combined with the original design DEF, or an incremental design database library that can be further used in iterative enhancement. Since the design rules, especially the via rules, may become increasingly more stringent in advanced technologies, using a commercial EDA tools can ensure error free creation of straps and via connections that may pass design rule check (DRC) and layout vs schematic (LVS).

Power strap enhancer PSE can also interact with voltage drop analysis tool VD_Analyzer for iterative improvements. For example, after a power strap enhancement is performed, the modified integrated circuit design may be stored in a modified design database (not shown in FIG. 1, please refer to FIG. 2). The modified integrated circuit design may be analyzed by analysis tool VD_Analyzer to determine what type of additional enhancement may be performed. Upon the analysis, additional power strap enhancements may be performed to the modified integrated circuit design. Each iteration of the analysis and strap enhancement further improves the power/ground networks. It is realized that although additional iterations can provide feedback for the qualitative improvement, it may increase the execution time and the complexity of power strap enhancer PSE.

FIG. 2 illustrates the block diagram of an architecture interface and the user interface of the voltage drop mitigation system. Power strap enhancer PSE may receive control inputs (also refer to FIG. 1) so that a plurality of user-specified parameters may be provided by users and used to control the strap enhancement. Exemplary parameters include an enhancement region(s), a target net (network), a valid layer or a valid layer list, a target layer or a target layer list, solution parameters, and the like. The details of the user-specified parameters are discussed as follows.

The enhancement region represents the region in the chip that will be enhanced by the power strap enhancer PSE. The target network is the name of the power network on which the enhancement is to be performed. For example, the target network may be any one of the VDD network, VSS network, or the like. For the selected target network, a target (metallization) layer or a list of target layers may be selected, so that only the power straps in the target layer(s) will be enhanced, while the power straps in other layers will not be enhanced. The valid layer and valid layer list specify which of the (metallization) layer(s) may be used for routing the redundant interconnection from a source node to a terminal node while forming the connections on the straps of target layer(s). The solution parameters include grid size, minimum spacing, search depth, increment length, partitions, and the like.

With the user-specified parameters, power strap enhancer PSE may receive the integrated circuit design from design database DesignDB and other information (such as design rules) from technology database TechDB, and perform the strap enhancement to portions of the selected target network in the selected enhancement region and selected target layer (s). The generated redundant straps may span across the valid layer(s). The modified integrated circuit design is stored in the modified database.

Figure 3:
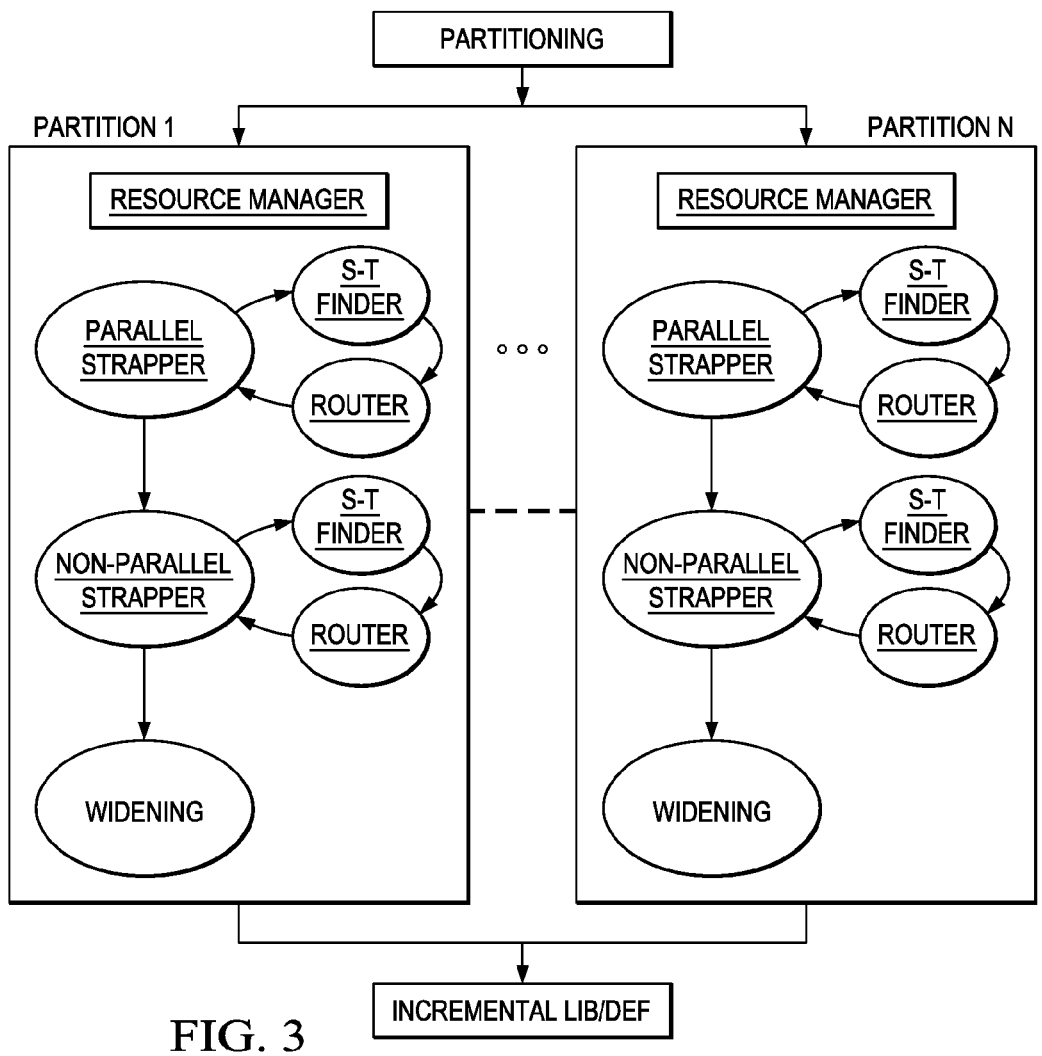
FIG. 3 illustrates the partitioning and the power strap enhancement of a power network.

FIG. 3 illustrates the architecture of partitioning and the strapping process. The integrated circuit design may be too large to be handled by a single program and may consume a significant amount of memory. Power strap enhancer PSE provides partitioning flexibility to users so that the users can choose to partition the respective chip into a plurality of partitions (partition 1 through partition N) according to X and Y directions that are parallel to edges of the chip. For example, if it was specified (through the control inputs as shown in FIG. 1, which correspond to the partition parameter in FIG. 2) that 5 partitions in the X direction and 5 partitions in the Y direction are desirable, then the chip (and each of the valid layers and target layers) is divided into 25 partitions. The partitioning leads to an increase in performance and a reduction in the memory requirement. After partitioning, each of the partitions is treated as an independent design space and analyzed for enhancement separately, and the enhancement results of the partitions are combined. Each of the partitions is fed to a (source-terminal pair) S-T finder, the S-T finder searches the straps belonging to a given network (in the given partition) and records them. The S-T finder then chooses two straps (pair) at a time in an incremental fashion and starts creating source and terminal node pairs, so that a router may find a redundant connection to connect the source node (S) to the respective terminal node (T) in the same node pair. The coordination of the S-T finder and the router may be controlled by a resource manager in power strap enhancer PSE.

Figure 4:
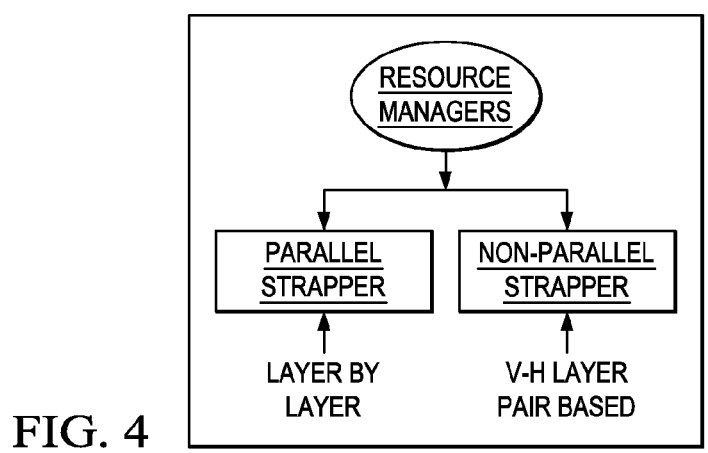
FIG. 4 illustrates a parallel strapper and a non-parallel strapper in the power strap enhancer.

Theoretically, in a given power network, one or more redundant straps may be created to interconnect a source node to a terminal node, providing there is enough room to create one without violating design rules. The router may look for a possibility of creating a strap between the source node and the terminal node through pre-determined algorithms. Depending on the location of source nodes and terminal nodes, an algorithm may be implemented, including a parallel strapping algorithm and a non-parallel strapping algorithm, as shown in FIG. 4, with the utilities for performing the algorithms referred to as a parallel strapper and a non-parallel strapper, respectively. Each of the parallel strapper and non-parallel strapper has its own S-T finder for finding pairs of S-T node pairs based on parameters specified by the users. For given target layers and a given network, all the existing straps belonging to the target layers may be sorted and recorded. Referring to FIG. 3, the operation of the parallel strapper, the non-parallel strapper, and the widening may be performed in any order, although the parallel strapper is shown as functioning before the non-parallel strapper.

Figure 5:
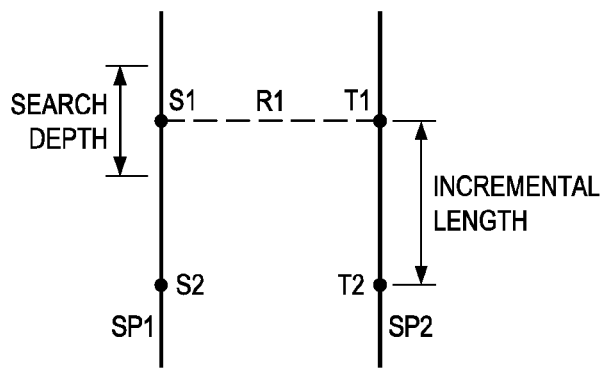
FIG. 5 schematically illustrates the operation of the parallel strapper.

FIG. 5 schematically illustrates how the parallel strapper deals with the connection of two parallel straps on a layer. The parallel strapper is used when the target layers only include a single layer, meaning that two parallel straps for which redundant interconnections are to be added are in a same metallization layer, and are parallel to each other. The valid layers (refer to FIG. 2), however, may be in multiple layers, including the target layer. Accordingly, a resulting redundant strap may be created in the target layer only, or may span across multiple valid layers through vias. For example, referring to FIG. 5, straps SP1 and SP2 are in a same layer, and are parallel to each other. Straps SP1 and SP2 are already interconnected, wherein the existing interconnection may not be in the illustrated region, and hence the existing interconnection is not illustrated. In an exemplary embodiment, the S-T finder finds an S-T pair, including source node S1 and terminal node T1, and then the router (refer to FIG. 3) tries to find a route connecting source node S1 to terminal node T1 without violating design rules. If such a route is found, redundant router R1 is considered as a candidate route, and may, or may not, be committed, depending on the percentage of commitment, as will be discussed in detail. In the example as shown in FIG. 5, route R1 is shown using a dotted line since it may be, or may not be, in the same layer as straps SP1 and SP2. Further, route R1 may not be a straight line and may include a zigzag pattern. After node pair S1/T1 is processed, the S-T finder may proceed on straps SP1 and SP2 by an incremental distance, which may be one of the user-specified parameters (refer to FIG. 2 also). A new node pair S2/T2 is then created by the S-T finder. The router then tries to route a connection between nodes S2 and T2. The process continues until all of the parallel strap pairs SP1/SP2 are examined. Further, power strap enhancer PSE will proceed to the next strap pair and repeat the steps of finding and routing redundant connections until all parallel strap pairs are examined for the selected target layer(s). The parallel straps in the same metallization layer are processed pair-by-pair until exhausted (as denoted in FIG. 4). Then the parallel strapper starts to process parallel straps on different metallization layers until all target layers are processed. After the process of all target layers, a plurality of candidate redundant routes is generated.

Figure 6:
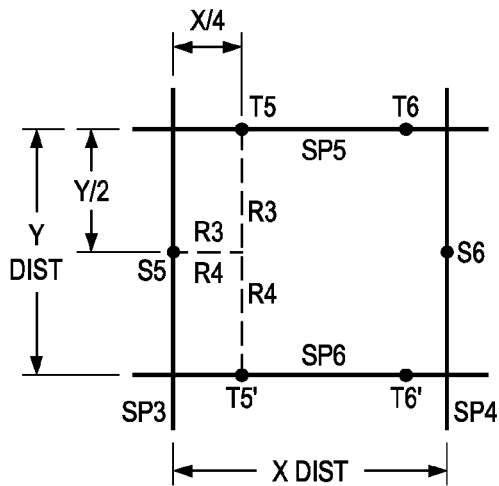
FIG. 6 schematically illustrates the operation of the non-parallel strapper.

FIG. 6 illustrates the non-parallel straps, which are processed by the non-parallel strapper. The non-parallel strapper is configured to generate a connection between the points on the straps that are not parallel to each other, and are in different metallization layers. The non-parallel strapper thus operates a vertical-horizontal (V-H) layer pair (as denoted in FIG. 4). For example, in FIG. 6, parallel straps SP3 and SP4 are in a same layer, while parallel straps SP5 and SP6 are in another layer. Straps SP3, SP4, SP5, and SP6 were originally in a same power network, and hence were electrically interconnected, although the interconnection is not shown. Power strap enhancer PSE will function to generate redundant connections to connect straps SP3 and SP4 to straps SP5 and SP6, if possible.

The S-T finder first finds the source and terminal node pairs between which connections are to be formed. For example, source node S5 in vertical strap SP3 forms a node pair with each of two terminal nodes T5 and T5' in horizontal straps SP5 and SP6. The router will thus try to find a route connecting node S5 to node T5, and a route connecting node S5 to node T5'. The resulting routes will include vias. Exemplary routes R3 and R4 are illustrated using dotted lines. After the processing of node pairs S5/T5/T5', the S-T finder may find additional S-T pairs using an increment length in the X direction and/or an increment length in the Y direction, which can be specified by users. In an exemplary embodiment, the incremental length in the X direction may be a fraction of the distance X dist (such as X/4) between neighboring straps SP3 and SP4, and the incremental length in the Y direction may be a fraction of the distance Y dist (such as Y/2) between neighboring straps SP5 and SP6. For example, the S-T finder may find S-T pair S6/T6 and S-T pair 56/T6'. The router then tries to find routes connecting these S-T pairs.

FIGS. 7 through 11 illustrate the operation of a router as shown in FIG. 4. A router is a part of power strap enhancer PSE with the objective of finding the shortest possible connectivity between two nodes with given valid layers respecting the existence of other existing networks and other features. The router ensures that there are no DRC and LVS violations. The DRC and LVS verification part is taken care of by router's internal DRC check engine, which does not allow the strap to be committed if there is any polygon in the close proximity of the redundant straps being created.

Figure 7:
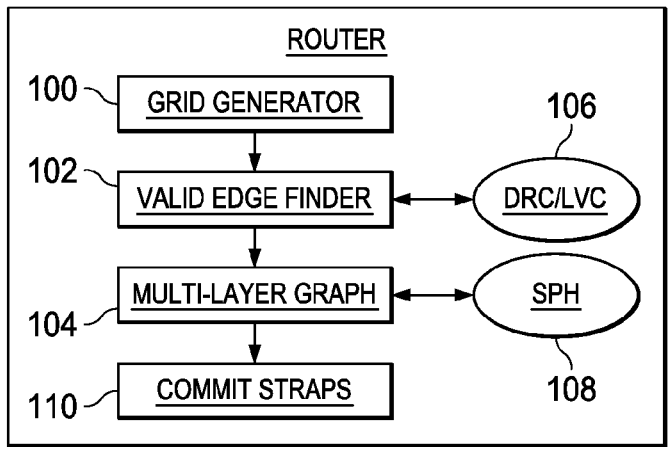
FIGS. 7 through 11 illustrate the operation of a router in the power strap enhancer.
Figure 8:
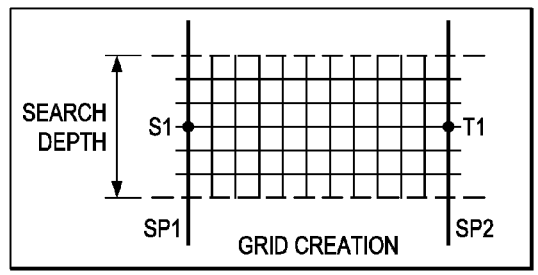
Figure 11:
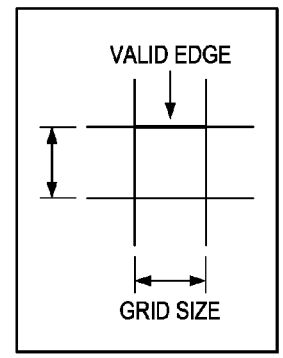

FIG. 7 illustrates a flow-chart of the router. To find a route connecting a source node to a terminal node, the router first generates grids for the target layer(s) and valid layer(s) through a grid generator (step 100), wherein the source node and the terminal node overlap the nodes of the grids. Further, the grids on different layers are vertically aligned, so that vias may be formed to interconnect nodes on different layers. FIG. 8 schematically illustrates straps SP1 and SP2 including source node S1 and terminal node T1, respectively. The grid is illustrated as including rectangles, which may be squares. The sizes of the grid may be specified by users (refer to the "grid size" in FIG. 2), and is shown in FIG. 11. Each of the squares includes four edges.

After the grids are created, a design rule check (DRC/LVC, step 106 in FIG. 7) is performed to find which of the edges are valid edges that can be used for routing (step 102 in FIG. 7). A valid edge indicates that a metal strap may be created to overlap the valid edge without violating design rules. If an edge is determined to be valid, the edge is recorded into a graph (step 104 in FIG. 7, also refer to FIG. 10). After all of the edges in all of the valid layers are processed, the valid edges are used for finding candidate redundant routes, while invalid edges are not recorded in the graph. Accordingly, invalid edges will not appear in any of the candidate redundant routes.

Figure 9:
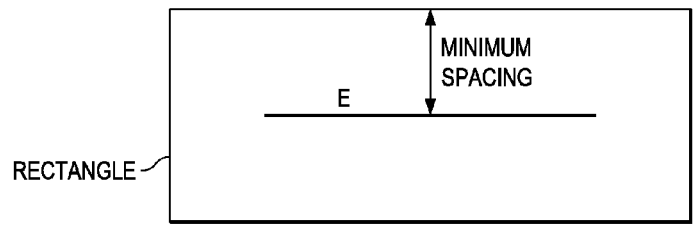

FIG. 9 illustrates an exemplary diagram for determining whether an edge is valid or not. Assuming edge E is an edge that is to be examined, to determine whether edge E is valid or not, a polygon, for example, a rectangle, is formed encircling edge E, wherein the distance between a side of the polygon and a respective side of the line is determined by the spacing rules that are selected from a table specifying spacing rules in technology database TechDB (FIGS. 1 and 2), wherein the spacing rules are partially determined by the width and the length of edge E. Once the polygon is constructed, it may be determined whether there are any other polygons (for example, from any other existing power network or signal lines) that touch, intersect, overlap, or lie inside this polygon. If there are, then edge E is invalid, and is not created in the graph. Otherwise, edge E is a valid edge.

Figure 10:
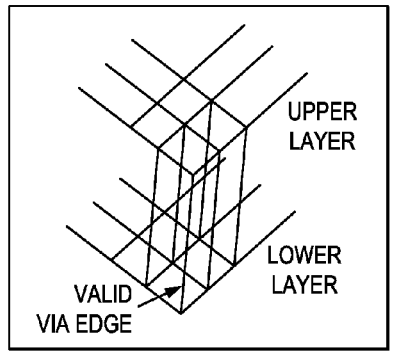

Since the valid layer(s) may include more than one layer, the graph for storing the valid edges will be a multi-level graph (a three-dimensional graph, step 104 in FIG. 7) representing a graph data structure, as is shown in FIG. 10, with the metallization layers constituting horizontal planes and vias between them constituting vertical planes. In this data structure, each point is represented as a node. The strap/route connecting two nodes on the same layer is represented as an edge, as shown in FIGS. 8, 9, and 11. The via connecting two nodes on different layers is also represented as an edge (FIG. 10). The size of a multi-layer graph data structure is controlled by users. For example, for a parallel-strap creation, the "grid size" and "search depth" parameters are responsible for the complexity of the multi-layer graph. This means that the smaller the "grid size" and the greater the "search depth" are, the more complex the multi-layer graph is. Therefore, there is a tradeoff between the complexity and the quality of the solution.

Once a multi-level graph is constructed with given source and destination nodes, the shortest possible path between two nodes may be found, and the two nodes may be connected using pieces of metals. The algorithm for finding the shortest possible path may be a built-in shortest path heuristic (SPH) (refer to step 108 FIG. 7) algorithm based on Dijkstra's algorithm, with a slight modification to Dijkstra's algorithm to suit the multi-layer graph data structure. In the algorithm, the possible paths are searched for each of the valid layers. If the algorithm reaches a leaf node (a node connected to only one edge) on any layer, then the algorithm travels to a neighboring layer (in the valid layers) through a via-edge and continues to find a path to the terminal node. Otherwise, the algorithm may traverse in the same layer.

After all candidate redundant routes in a given partition are found, straps are committed (refer to step 110 FIG. 7), which means that the routes are established in the integrated design and will later be implemented on the physical chip. However, a candidate redundant route is not necessarily committed, which means that some of the candidate redundant routes may be abandoned. Power strap enhancer PSE provides a capability allowing users to specify the percentage of commitment, which means that only a certain percentage (less than 100 percent) of candidate redundant straps are committed, while remaining candidate redundant routes are abandoned. For example, if the percentage of commitment is 10 percent, then for every ten candidate redundant straps, only one is committed. The chip area involved in the abandoned candidate redundant routes may be reused in the enhancement of other networks. For example, if a candidate redundant route is abandoned in the enhancement of a VDD network, in a subsequent enhancement of a VSS network, the space reserved for the abandoned candidate redundant route may be used for constructing redundant VSS straps. Further, different power networks may have different percentages of commitment. For example, the VDD network may have a higher percentage of commitment than the VSS network.

In addition to the redundant strap creation, the existing straps can also be widened (please refer to FIG. 4). In a given partition, power strap enhancer PSE may find straps in a given layer and records them. Each of the straps is then visited to determine whether it is possible to widen it to a size greater than its existing size. If the widening does not violate design rules, the widening may be performed, and the respective straps may be further investigated to see whether further widening is possible. This process is continued until a maximum allowable width of the strap for the given technology is reached. The embodiments provide the capability to enhance the weakest power network first, and then other networks are enhanced. The weakest power network refers to the network that, for example, has the highest voltage drops.

Referring back to FIG. 1, iterations of strap enhancement may be performed. After each enhancement, the VD-analyzer may be used to simulate the voltage drops in the resulting modified design (FIG. 2) that include the committed redundant straps, and further enhancement iterations may be performed, if necessary, depending on the results of the VD-analyzer.

It is noted that the strap enhancement is performed before the dummy patterns (refer to FIG. 13) are added into the unused spaces in metallization layers, so that the unused spaces in the metallization layers are used for the enhancement of the power networks first. As known in the art, the dummy metals may not be electrically connected to any power network and/or any active devices, such as transistors. Further, optical proximity corrections are made to the modified integrated design, including the modified power networks, to ensure the networks may be successfully implemented on physical semiconductor chips.

It is further realized that decoupling capacitors may be formed in the integrated circuit design, and reside in cell rows, which are powered by power and ground networks. These decoupling capacitors observe higher impedance during charging and discharging processes. If a decoupling capacitor cannot charge and discharge fast enough, it may fail to meet the charge requirement. In the embodiments, by using non-parallel strapping, connections may be made from top metal layer, for example, metallization layer Mtop in FIG. 12, down to the decoupling capacitor pin (which may be in metallization layer M1), thereby significantly reducing the impedance observed by decoupling capacitors. The connections from the top metallization layer to the decoupling capacitor pin may also be further enhanced using the embodiments. Therefore, the charging and discharging of the decoupling capacitors may be performed faster, and the dynamic voltage drop may be reduced.

Although the embodiments and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A method of designing an integrated circuit, the method comprising:
   providing an integrated circuit design comprising a power network;
   providing a voltage drop mitigation system comprising a power strap enhancer configured to automatically find a source node and a terminal node in the power network;
   adding a redundant strap for the power network using the voltage drop mitigation system, wherein the redundant strap interconnects the source node and the terminal node; and
   after the step of adding the redundant strap, adding dummy patterns.

2. The method of claim 1 further comprising, after the step of adding dummy patterns, implementing the integrated circuit design on a physical chip.

3. The method of claim 1 further comprising performing a region selection in the integrated circuit design to add redundant straps into selected regions in metallization layers in the integrated circuit design, and not to add the redundant straps into non-selected regions in the integrated circuit design.

4. The method of claim 1 further comprising:
   partitioning metallization layers in the integrated circuit design into a plurality of partitions; and
   adding redundant straps to the power network partition-by-partition for each of the plurality of partitions.

5. The method of claim 1, wherein the voltage drop mitigation system comprises a parallel strapper configured to perform the step of adding the redundant strap, and wherein the source node and the terminal node are on a first strap and a second strap in a same metallization layer of the integrated circuit design, respectively, with the first strap being parallel to the second strap.

6. The method of claim 1, wherein the voltage drop mitigation system comprises a non-parallel strapper configured to perform the step of adding the redundant strap, and wherein the source node and the terminal node are on a first strap and a second strap, respectively, with the first strap and the second strap being in different metallization layers of the integrated circuit design.

7. The method of claim 6, wherein the first strap is perpendicular to the second strap.

8. The method of claim 1, wherein the step of adding the redundant strap comprises:
   performing an automatic routing to form a redundant route from the source node to the terminal node; and
   committing the redundant strap.

9. The method of claim 8, wherein the step of performing the automatic routing comprises:
   creating a grid for metallization layers in the integrated circuit design, with the source node and the terminal node being nodes of the grid;
   finding valid edges in the grid; and
   forming the redundant route using the valid edges only.

10. The method of claim 1 further comprising:
    determining a plurality of source nodes and a plurality of terminal nodes;
    finding a plurality of candidate redundant routes connecting the plurality of source nodes to respective ones of the plurality of terminal nodes; and
    committing a portion of the candidate redundant routes according to a pre-selected percentage of commitment, with remaining ones of the candidate redundant routes not being committed.

11. The method of claim 1 further comprising:
    after the step of adding the redundant strap for the power network, saving the integrated circuit design comprising the redundant strap as a modified integrated circuit design;
    analyzing the modified integrated circuit design; and
    adding additional redundant straps to the modified integrated circuit design based on a result of the step of analyzing.

12. The method of claim 11, wherein the steps of saving the integrated circuit design, analyzing the modified integrated circuit design, and adding additional redundant straps may be performed repeated for one or more iterations.

13. The method of claim 1 further comprising adding an additional redundant strap connecting a node in a top metal layer to a decoupling pin of a decoupling capacitor.

14. The method of claim 1, wherein the step of automatically finding the source node and the terminal node is performed using a pre-determined increment length, with the increment length being a distance between neighboring source nodes on a same strap.

15. The method of claim 1 further comprising widening an existing strap for the power network using the voltage drop mitigation system.

16. The method of claim 1 further comprising receiving a user-specified percentage of commitment from a user interface.

17. The method of claim 1, wherein the voltage drop mitigation system comprises a parallel strapper configured to perform the step of adding the redundant strap, and wherein the source node and the terminal node are on a first strap and a second strap, respectively, with the first strap and the second strap being in different metallization layers of the integrated circuit design.

18. The method of claim 1 further comprising receiving an input selected from a region in the integrated circuit design, a target network of the integrated circuit design, a target layer list in a plurality of metallization layers in the integrated circuit design, a valid layer list in the plurality of metallization layers, and combinations thereof.

19. The method of claim 18, wherein the adding the redundant strap further comprises:
    finding redundant power straps for the power network by applying the input; and
    committing a pre-selected percentage of the redundant power straps.

20. The method of claim 19, wherein the pre-selected percentage is less than one hundred percent.

21. The method of claim 19 further comprising:
    before the step of finding the redundant power straps, receiving a partitioning specification;
    partitioning the plurality of metallization layers to generate a plurality of partitions; and
    performing a power strap enhancement for portions of the power network in each of the plurality of partitions in a parallel or a partition-by-partition style.

* * * * *